(12) United States Patent
Liang (10) Patent No.: US 8,638,406 B2
(45) Date of Patent: Jan. 28, 2014

(54) BACKLIGHT MODULE AND LIQUID CRYSTAL DISPLAY DEVICE HAVING THE SAME

(75) Inventor: Shuo-Zhen Liang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 65 days.

(21) Appl. No.: 13/376,557

(22) PCT Filed: Oct. 11, 2011

(86) PCT No.: PCT/CN2011/080655
§ 371 (c)(1),
(2), (4) Date: Dec. 6, 2011

(87) PCT Pub. No.: WO2013/044531
PCT Pub. Date: Apr. 4, 2013

(65) Prior Publication Data
US 2013/0077019 A1 Mar. 28, 2013

(30) Foreign Application Priority Data
Sep. 28, 2011 (CN) .......................... 2011 1 0290490

(51) Int. Cl.
*G02F 1/1333* (2006.01)

(52) U.S. Cl.
USPC ................. 349/58; 349/64; 349/65; 362/612; 361/679.01

(58) Field of Classification Search
None
See application file for complete search history.

(56) References Cited

U.S. PATENT DOCUMENTS

2008/0180972 A1 7/2008 Sakamoto et al.
2011/0141670 A1 6/2011 Jeong

FOREIGN PATENT DOCUMENTS

| CN | 101871596 A | 10/2010 |
|---|---|---|
| JP | 2008299182 A | 12/2008 |

*Primary Examiner* — Thanh-Nhan P Nguyen
(74) *Attorney, Agent, or Firm* — Muncy, Geissler, Olds & Lowe, PLLC (57) ABSTRACT

A backlight module and a liquid crystal display device having the same, it comprises a LED light bar, a heat dissipating piece and a back plate. By using fixing elements, the LED light bar is fixed on the heat dissipating piece, and the heat dissipating piece is fixed on the back plate. It further comprises a stopping piece, and the LED light bar is fixed on the heat dissipating piece by the fixing elements going through the stopping piece.

20 Claims, 7 Drawing Sheets

BACKLIGHT MODULE AND LIQUID CRYSTAL DISPLAY DEVICE HAVING THE SAME

FIELD OF THE INVENTION

The present invention relates to a liquid crystal display device and more particularly to a backlight module structure of a liquid crystal display device.

BACKGROUND OF THE INVENTION

A liquid crystal display device employs liquid crystals to display images. Typically it is composed of a liquid crystal panel, a backlight module, related digital circuits and a power supply. Backlight module can be divided into three types in terms of a position of a light tube: 1) Side lighting type structure which a light source is disposed by a lateral side of a light guide plate; 2) Direct lighting type structure which light is emitted from a spontaneous light source and is reflected by a reflecting plate to travel upward, and is emitted from a front after it is diffused evenly by a diffusing plate; 3) Hollow lighting type structure which a hot-cathode tube is used as a light source, this structure uses air as a media for light. A light pointed downward is upwardly reflected by a prism and a reflecting plate. A part of light travels upward to go through a light guide plate and is emitted from the surface of the light source, and another part of light enters into a cavity again because of total reflection, then is emitted through the light guide plate after being refracted and reflected; however, a light pointed upward enters into the light guide plate and is emitted directly, or is emitted after refractions and reflections, and the light guide plate is a wedge structure.

Figure 1A:
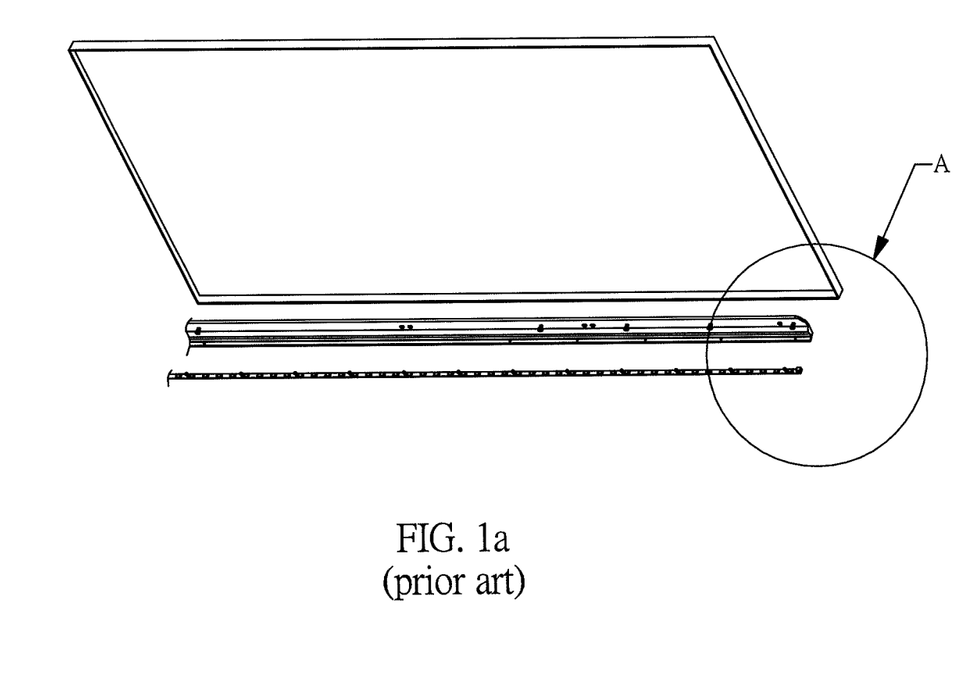
FIG. 1a is an illustration of a fixing structure of a LED light bar of a conventional backlight module.
Figure 1B:
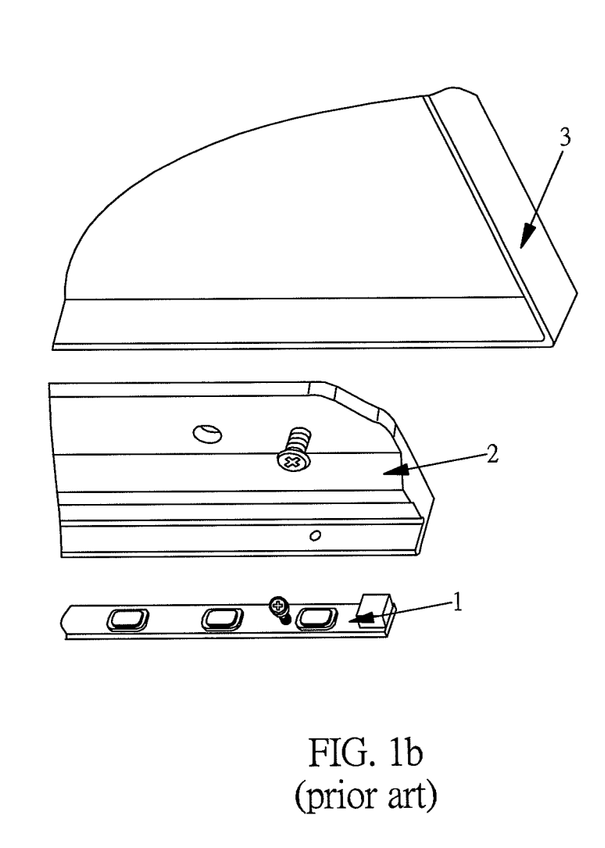

A conventional side lighting type backlight module employs LED as a light source. Referring to FIGS. 1a and 1b, a LED light bar 1 is fixed on a horizontal wall of a heat dissipating piece 2 by screws going through fixing holes disposed on the horizontal wall. The heat dissipating piece 2 is then fixed on a back plate 3 by screws going through fixing holes disposed on a vertical wall of the heat dissipating piece 2. This installation method for the LED light bar 1 requires a number of procedures and its labor cost is high; in addition, it also has the following drawbacks:

If heat conductive adhesive is used for fixing the LED light bar 1, it will be difficult to dismount the LED light bar 1 if it needs to be reworked, even if it can be dismounted, the LED light bar 1 will be deformed easily and will cause defects in later utilization.

If the LED light bar 1 is fixed by screws, LED pitches will be inconsistent because some places have screws while some do not; therefore, a dot pattern of a light guide plate (not shown) has to be reinforced for locations with the screws, in order to prevent dimmed blocks shown on a display area of the module corresponding to the locations of the screws because of the inconsistent LED pitches. It is a drawback for positioning of the light guide plate and its dot pattern design. Furthermore, because the LED pitches of the locations with and without the screws are inconsistent, thus a light mixing distance in the module design has to be calculated based on large LED pitches, this causes an actual light mixing distance bigger than normal. In addition, heads of the screws are exposed outside between the LEDs, therefore intervals between two soldering leads of LED electrodes and the exposed head are very small, which can cause safety problems of short circuit or high voltage sparking easily. Therefore, some provide a solution by fixing the LED light bar on its reverse side by screws, that means, blind holes with threads on a PCB of the LED light bar are locked by screws reversely, but a thickness of the PCB of the LED light bar has to be increased or else it will be impossible for the screws to be locked tightly, it will increase the costs if the PCB of the LED light bar is made thicker.

SUMMARY OF THE INVENTION

An object of the present invention is to provide a backlight module structure of a liquid crystal display device by which a LED light bar can be installed securely with lower costs while a backlight effect is ensured.

In order to achieve the abovementioned object, the present invention provides a backlight module, and it comprises a LED light bar, a heat dissipating piece and a back plate. By using fixing elements, the LED light bar is fixed on the heat dissipating piece, and the heat dissipating piece is fixed on the back plate; in addition, it further comprises a stopping piece, and the LED light bar is fixed on the heat dissipating piece by the fixing elements going through the stopping piece.

In order to achieve the abovementioned object, the present invention further provides a liquid crystal display device, and it comprises the abovementioned backlight module.

Comparing with conventional techniques and according to a liquid crystal display device and its backlight module of the present invention, by using a combination of the stopping piece and the heat dissipating piece, a LED light bar can be conveniently fixed on the heat dissipating piece, and the LED light bar can be installed securely with lower costs while a backlight effect is ensured.

BRIEF DESCRIPTION OF THE DRAWINGS

FIG. 1b is partially enlarged view of a part A of FIG. 1a;

FIG. 2b is an enlarged view of a stopping piece of FIG. 2a;

FIG. 4b is an exploded view of FIG. 4a.

DETAILED DESCRIPTION OF THE INVENTION

The present invention will become more fully understood by reference to the following detailed description thereof when read in conjunction with the attached drawings.

According to a backlight module of a liquid crystal display device of the present invention, a stopping piece with installation holes is added to a conventional structure of a LED light bar, a heat dissipating piece and a back plate; the LED light bar, the heat dissipating piece and the back plate can be fixed together by using fixing elements and the installation holes of the stopping piece, so that troubles and problems caused by having installation holes on the LED light bar can be avoided.

Figure 2A:
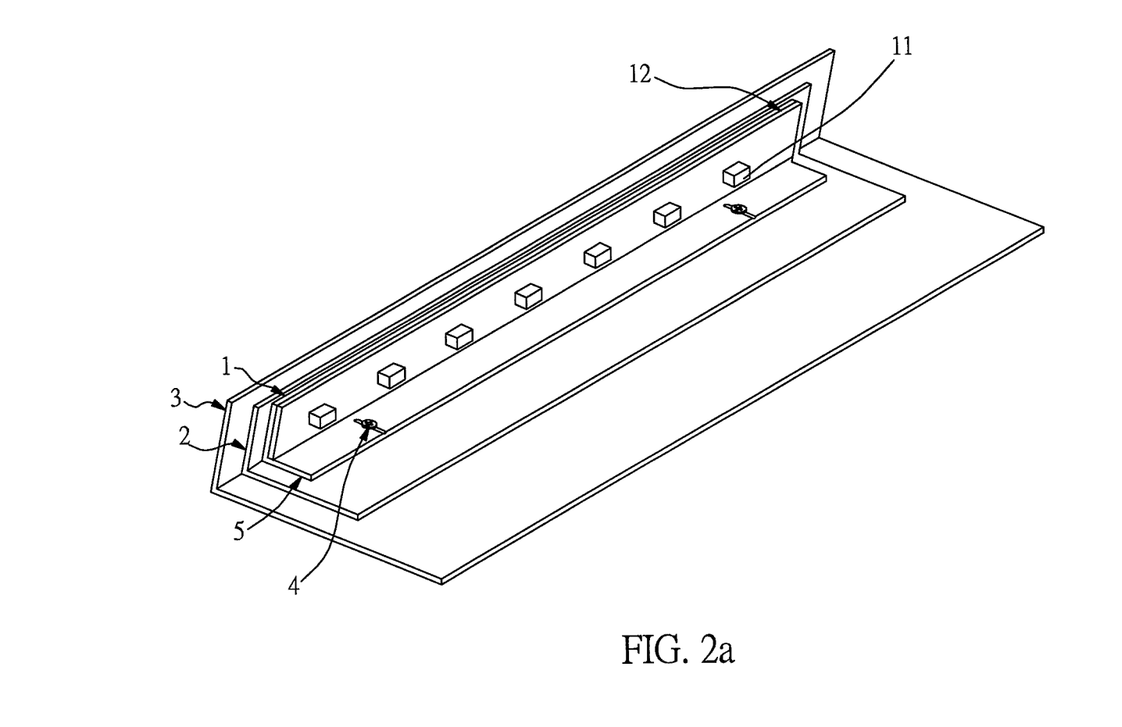
FIG. 2a is an illustration of a fixing structure of a LED light bar of a backlight module of a first embodiment of the present invention.
Figure 2B:
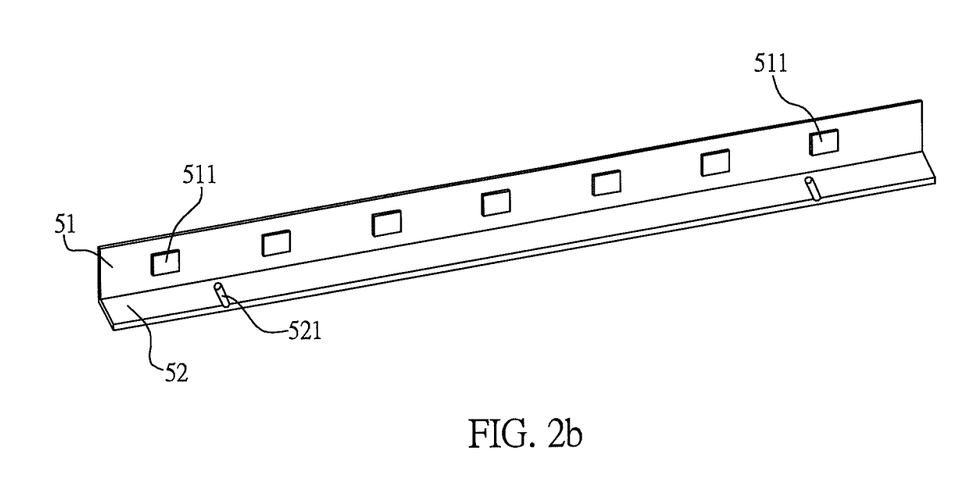

Referring to FIGS. 2a and 2b, they show a fixing structure of a LED light bar of a backlight module of a first embodiment of the present invention, and it mainly comprises: a LED light bar 1, a heat dissipating piece 2, a back plate 3, fixing elements 4 and a stopping piece 5.

The LED light bar 1 includes a printed circuit board 12 and a plurality of LEDs 11 evenly disposed on the printed circuit board 12.

The heat dissipating piece 2, the back plate 3 and the stopping piece 5 are in an L-shape, and the heat dissipating piece 2 includes a vertical wall and a horizontal wall. The stopping piece 5 includes a vertical portion 51 and a horizontal portion 52 extended and bended horizontally from a bottom end of the vertical portion 51, a plurality of openings 511 is disposed within the vertical portion 51, and installation holes 521 are disposed in the horizontal portion 52. When they are assembled together, a back of the printed circuit board 12 of the LED light bar 1 is disposed against the vertical wall of the heat dissipating piece 2 for heat dissipation, the LEDs 11 on the LED light bar 1 go through the corresponding openings 511 of the stopping piece 5, and the fixing elements 4 go through the installation holes in the stopping piece 5 to fix the LED light bar 1 on the heat dissipating piece 2.

Figure 3:
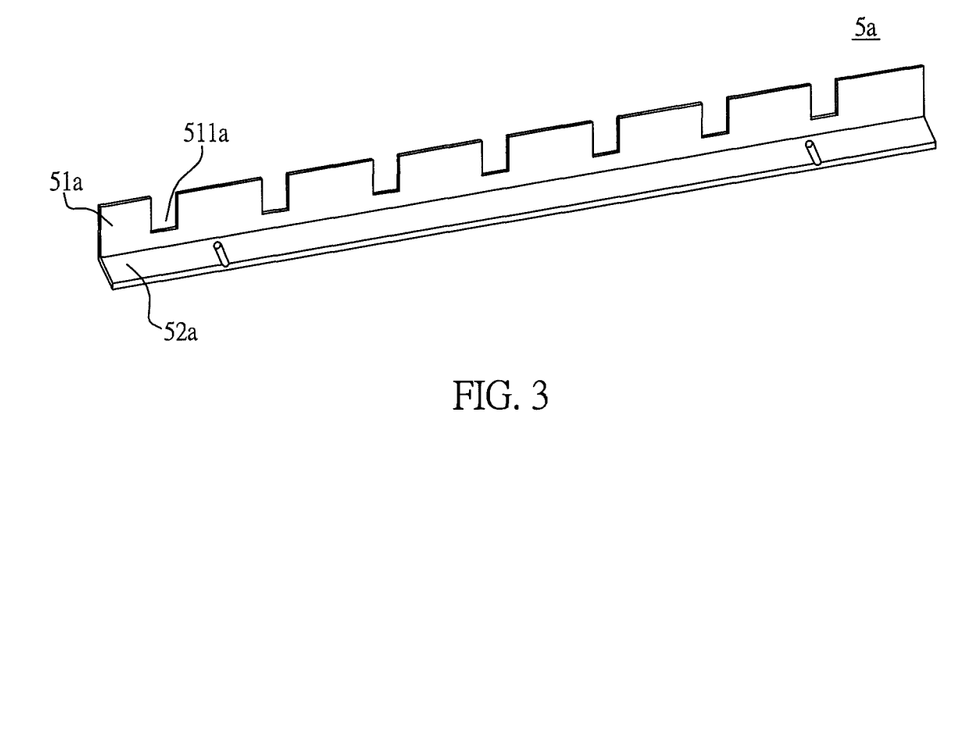
FIG. 3 is an illustration of a stopping piece of a fixing structure of a LED light bar of a backlight module of a second embodiment of the present invention.

FIG. 3 shows a stopping piece of a fixing structure of a LED light bar of a backlight module of a second embodiment of the present invention. The differences between this embodiment and the abovementioned first embodiment lie in: In the first embodiment mentioned above, the openings 511 within the vertical portion 51 of the stopping piece 5 are through holes surrounded by the vertical portion 51 for the LEDs 11 on the LED light bar 1 to go through correspondingly; while in this embodiment, a stopping piece 5a includes a vertical portion 51a and a horizontal portion 52a extended and bended horizontally from a bottom end of the vertical portion 51a, and opening 511a within the vertical portion 51a are grooves with an opened upper end for the LEDs 11 on the LED light bar 1 to go through correspondingly.

Figure 4A:
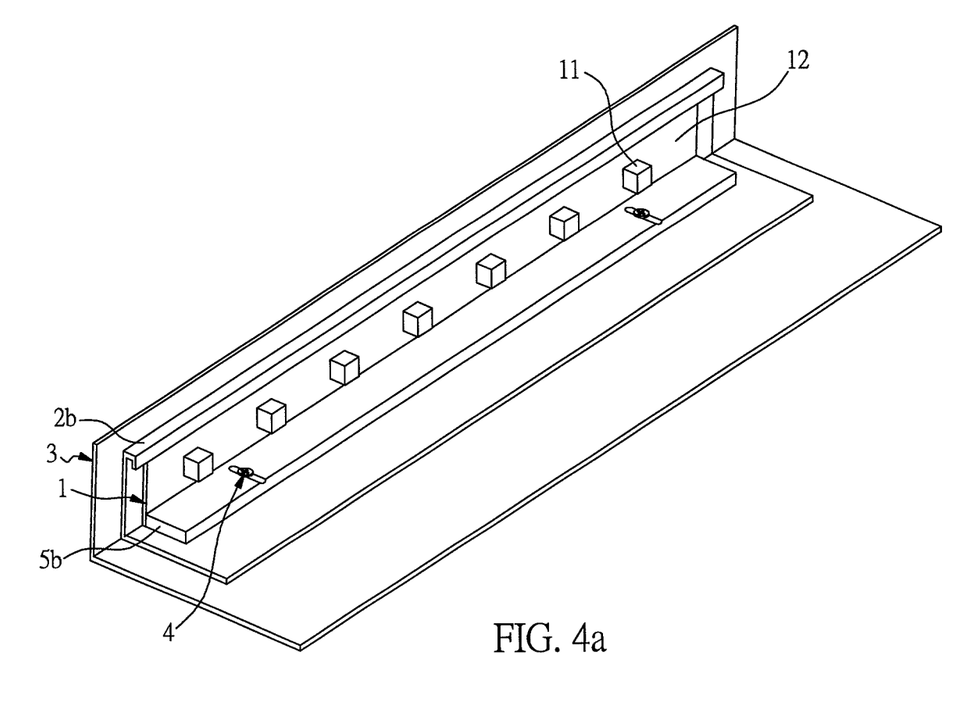
FIG. 4a is an illustration of a fixing structure of a LED light bar of a backlight module of a third embodiment of the present invention.
Figure 4B:
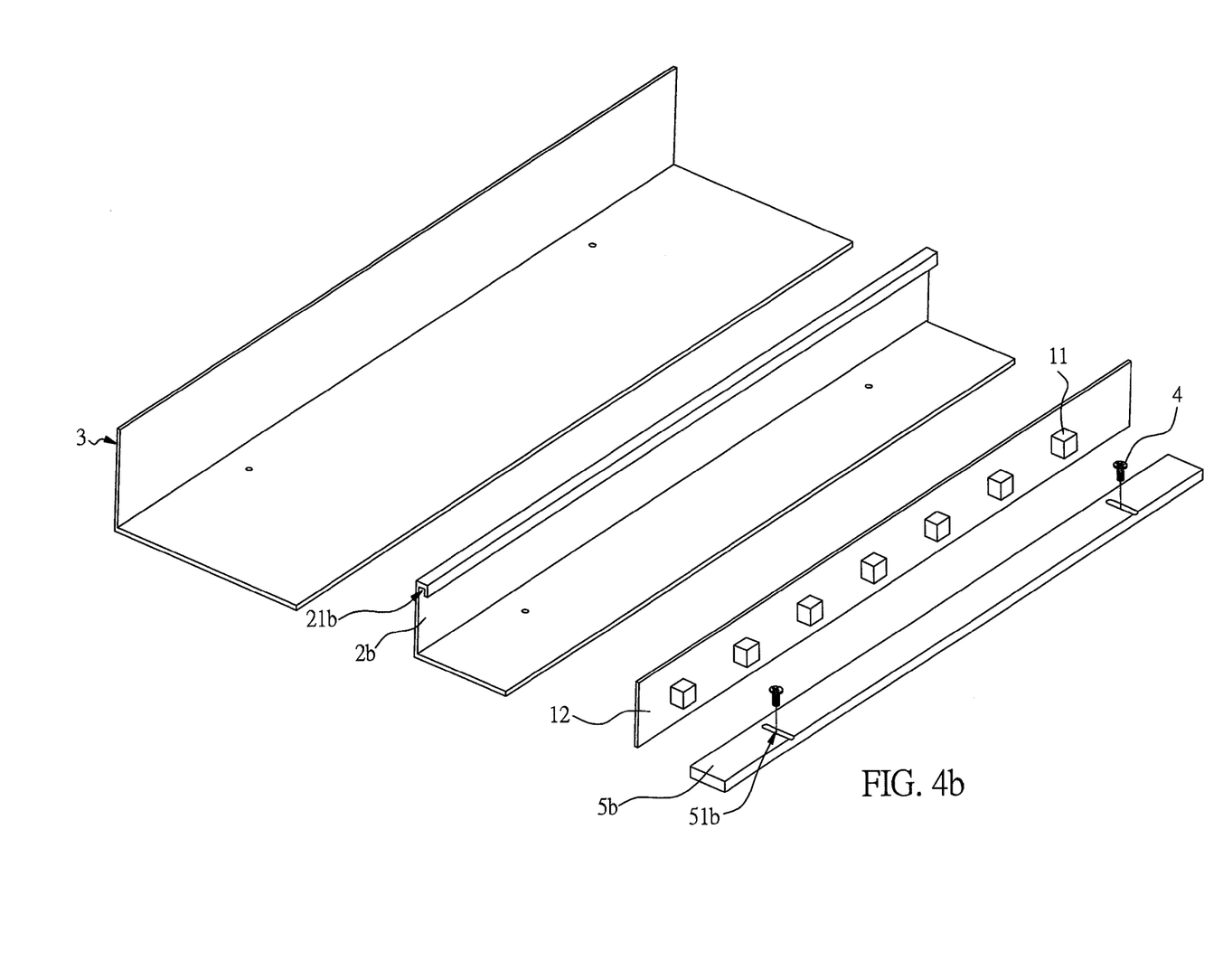

FIGS. 4a and 4b show a fixing structure of a LED light bar of a backlight module of a third embodiment of the present invention. The differences between this embodiment and the abovementioned first embodiment lie in: In the first embodiment mentioned above, the stopping piece 5 includes the vertical portion 51 and the horizontal portion 52 extended and bended horizontally from the bottom end of the vertical portion 51; while in this embodiment, a stopping piece 5b only includes a horizontal portion 51b, and a heat dissipating piece 2b further includes a groove 21b with an opening facing downward disposed at an upper end of a vertical wall. An upper end of the printed circuit board 12 of the LED light bar 1 is enclosed in the groove 21b of the heat dissipating piece 2b, and a lower end of the printed circuit board 12 of the LED light bar 1 is pressed against by a side edge of the stopping piece 5b. In other embodiments, the stopping piece 5b can be structured the same as the L-shaped structure having the through holes or the grooves for the LEDs 11 on the LED light bar 1 to go through correspondingly mentioned in the first and the second embodiments.

It should be noted that, a backlight module of the present invention further comprises a light guide plate (not shown in the figures) to match with the LED light bar 1, the stopping pieces 5, 5a or 5b can further act as a positioning structure for the light guide plate (not shown in the figures). In other words, the stopping pieces 5, 5a or 5b can be provided for installations of both the LED light bar 1 and the light guide plate, therefore costs of rivets for positioning of the light guide plate in conventional techniques can further be saved.

Comparing with conventional techniques and according to a backlight module and a liquid crystal display device having the same, by employing the separate and detachable stopping pieces 5, 5a or 5b to fix the LED light bar 1, and the installation holes 521 in the stopping piece 5 can be positioned according to requirements, so that the fixing elements 4 can lock and fix the LED light bar 1, and the heat dissipating pieces 2 and 2b and the back plate 3 together; therefore, the structure of the LED light bar 1 will not be affected, and the LED light bar 1 can be installed securely with lower costs while a backlight effect is ensured.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A backlight module, comprising:
   an LED light bar;
   a heat dissipating piece;
   a back plate; and
   a stopping piece,
   wherein by using fixing elements the LED light bar is fixed on the heat dissipating piece, and the heat dissipating piece is fixed on the back plate, the LED light bar is fixed on the heat dissipating piece by the fixing elements going through the stopping piece;
   wherein a groove with an opening facing downward is disposed at an upper end of the heat dissipating piece, an upper end of the LED light bar is enclosed in the groove of the heat dissipating piece, installation holes are disposed in the stopping piece, the fixing elements go through the installation holes in the stopping piece to fix the LED light bar, the heat dissipating piece, and the back plate.

2. The backlight module as claimed in claim 1, wherein the stopping piece is in an L-shape and includes the vertical portion and the horizontal portion extended and bended horizontally from the bottom end of the vertical portion, and a plurality of openings is disposed within the vertical portion for the corresponding LEDs on the LED light bar to go through.

3. The backlight module as claimed in claim 2, wherein the backlight module further comprises a light guide plate to match with the LED light bar, and the light guide plate is positioned by the stopping piece.

4. The backlight module as claimed in claim 1, wherein the stopping piece is a flat plate structure.

5. The backlight module as claimed in claim 4, wherein the backlight module further comprises a light guide plate to match with the LED light bar, and the light guide plate is positioned by the stopping piece.

6. The backlight module as claimed in claim 1, wherein the heat dissipating piece is in an L-shape and includes a vertical wall and a horizontal wall, and a groove with an opening facing downward is disposed at an upper end of the vertical wall.

7. The backlight module as claimed in claim 6, wherein the backlight module further comprises a light guide plate to match with the LED light bar, and the light guide plate is positioned by the stopping piece.

8. The backlight module as claimed in claim 1, wherein the backlight module further comprises a light guide plate to match with the LED light bar, and the light guide plate is positioned by the stopping piece.

9. The backlight module as claimed in claim 1, wherein the backlight module further comprises a light guide plate to match with the LED light bar, and the light guide plate is positioned by the stopping piece.

10. A liquid crystal display device, comprising the backlight module as claimed in claim 1.

11. The liquid crystal display device as claimed in claim 10, wherein the stopping piece is in an L-shape and includes a vertical portion and a horizontal portion extended and bended horizontally from a bottom end of the vertical portion, and a plurality of openings is disposed within the vertical portion for corresponding LEDs on the LED light bar to go through, installation holes are disposed in the horizontal portion, the fixing elements go through the installation holes to fix the LED light bar, the heat dissipating piece and the back plate.

12. The liquid crystal display device as claimed in claim 11, wherein the openings within the vertical portion of the stopping piece are through holes being sealed all around or are grooves with opened upper ends.

13. The liquid crystal display device as claimed in claim 10, wherein the backlight module further comprises the light guide plate to match with the LED light bar, and the light guide plate is positioned by the stopping piece.

14. A backlight module, comprising:
an LED light bar;
a heat dissipating piece;
a back plate; and
a stopping piece,
wherein by using fixing elements the LED light bar is fixed on the heat dissipating piece, and the heat dissipating piece is fixed on the back plate, the LED light bar is fixed on the heat dissipating piece by the fixing elements going through the stopping piece;
wherein the stopping piece is in an L-shape and includes a vertical portion and a horizontal portion extended and bended horizontally from a bottom end of the vertical portion, and a plurality of openings is disposed within the vertical portion for corresponding LEDs on the LED light bar to go through, installation holes are disposed in the horizontal portion, the fixing elements go through the installation holes to fix the LED light bar, the heat dissipating piece and the back plate.

15. The backlight module as claimed in claim 14, wherein the openings within the vertical portion of the stopping piece are through holes being sealed all around or are grooves with opened upper ends.

16. The backlight module as claimed in claim 15, wherein the openings within the vertical portion of the stopping piece correspond to a disposition of each of the LEDs on the LED light bar.

17. The backlight module as claimed in claim 16, wherein the backlight module further comprises a light guide plate to match with the LED light bar, and the light guide plate is positioned by the stopping piece.

18. The backlight module as claimed in claim 15, wherein the backlight module further comprises a light guide plate to match with the LED light bar, and the light guide plate is positioned by the stopping piece.

19. The backlight module as claimed in claim 14, wherein the backlight module further comprises a light guide plate to match with the LED light bar, and the light guide plate is positioned by the stopping piece.

20. The backlight module as claimed in claim 14, wherein the backlight module further comprises a light guide plate to match with the LED light bar, and the light guide plate is positioned by the stopping piece.

* * * * *